June 16, 1925.  1,542,318
G. B. POLLOCK
MAKE UP MIRROR
Filed Sept. 19, 1921
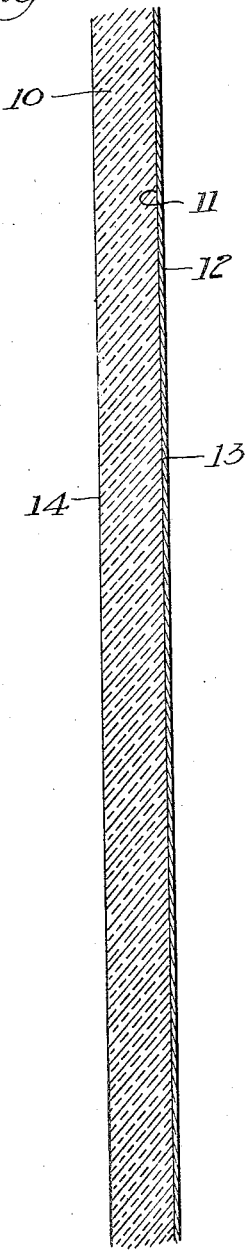
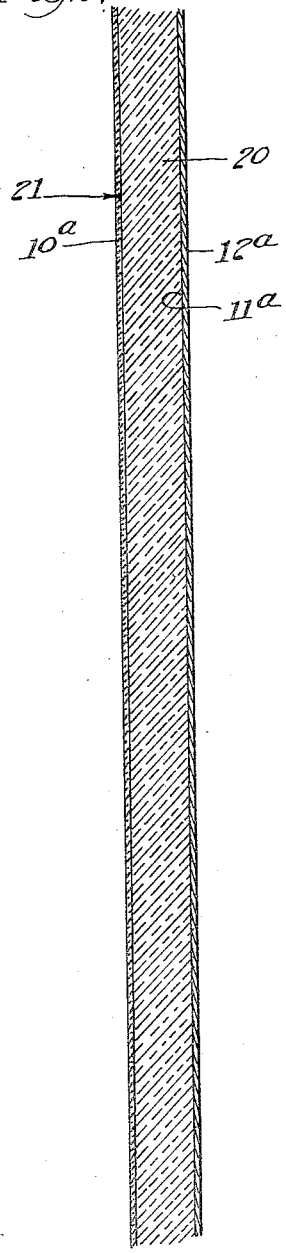
Inventor:
Gordon B. Pollock
By James T. Barkeley
his Attorney Patented June 16, 1925.                                1,542,318

UNITED STATES PATENT OFFICE.

GORDON B. POLLOCK, OF HOLLYWOOD, CALIFORNIA.

MAKE-UP MIRROR.

Application filed September 19, 1921. Serial No. 501,720.

*To all whom it may concern:*

Be it known that I, GORDON B. POLLOCK, a citizen of the United States, residing at Hollywood, in the county of Los Angeles and State of California, have invented new and useful Improvements in Make-Up Mirrors, of which the following is a specification.

This invention relates to a reflector or mirror, and it is an object of the invention to provide a device for selectively reflecting light.

It is well known that ordinary photographic apparatus registers different colored lights in different manners or to different degrees. When it is desired to make good photographs it is advisable to view the object or set through a color filter, which passes light in the same manner and to the same degree as it is registered by the photographic apparatus, in order to be sure that the various parts to be photographed are of a color and shade to be registered in the desired manner and to give the desired contrasts. Actors and actresses experience considerable difficulty in making up so they will photograph in the desired manner. They use an ordinary mirror while making-up and therefore have to guess more or less as to the colors and shade to use.

It is an object of this invention to provide a device which will selectively reflect light in the same manner and to the same degree as it is registered by photographic apparatus, enabling a person to know, when making-up, what colors and shades to use and to know what contrasts and values will appear in the photograph.

A distinctive feature of the preferred form of the device provided by the present invention is that it is compact and no more complicated than an ordinary mirror, and that it is very nearly as efficient as an ordinary mirror. This feature of the invention makes the device as convenient and desirable to use as any ordinary mirror and therefore makes it commercially practical and valuable.

Another feature of the device provided by the present invention is its extreme simplicity of construction and manufacture and its cheapness of manufacture. The device can be made practically as easily and cheaply as any mirror.

The various objects and features of the invention will be best and more fully understood from the following detailed description of typical embodiments of the invention throughout which reference is had to the accompanying drawings in which—

Fig. 1 is a more or less diagrammatic sectional view of a preferred form of the invention; and Fig. 2 is a more or less diagrammatic view of another preferred form of the invention.

The present invention provides, in combination, a reflective surface and a selective color filter, the color filter being arranged in relation to or in connection with the reflective surface so that light reflected by the surface is selected by the filter. In accordance with the preferred form of the invention the reflective surface and filter are carried or arranged together in, or to form, a single unitary structure or device. In Fig. 1 of the drawings I illustrate such a preferred embodiment of the invention. In Fig. 1 of the drawings numeral 10 designates the color filter which, in this instance is formed of glass in, or throughout, which is carried a dye or material, or combinations of materials, which will filter light in the desired manner, and numeral 11 designates the reflective surface which in this instance is the inner surface of a body of silver 12 or the like, carried on the rear surface 13 of the filter 10. The body of silver 12 having the reflective surface 11 may, obviously, be applied to and carried on the surface 13 of the reflector 10 in a manner such as the silver of an ordinary mirror is applied to and carried on the rear surface of the glass. The filter 10, being formed of a panel or sheet of glass in which is carried or embedded the material or materials which cause the desired filtering action, is permanent and its outer surface 14 can be washed or cleaned, as can the surface of any ordinary mirror, without in any way effecting it. The body 12 of silver is permanent on the rear surface 13 of the filter 10 so that it forms with the filter a unitary device capable of being mounted, handled or manipulated like any ordinary mirror, or the like. The filter being in the form of a glass panel forms an effective carrier for the body 12 of silver and renders the device as solid and durable as any ordinary mirror.

Further, the filter 10 being in the form of a glass plate and the reflective surface 11 being at or on the rear surface of the glass plate, the device has no more surfaces through which light must pass than an ordinary mirror and is practically as efficient as an ordinary mirror.

It will be undertood that my "filter" may be incorporated with the mirror surface itself instead of with the glass. For instance, a clear glass may be used, and the reflective surface formed of a substance that, by absorption, will reflect the kind of light desired. For instance the mirror silvering may be colored to reflect blue light to just the same selecting extent that a blue glass will select blue light.

In Fig. 2 of the drawings, I show another form in which the present invention may be embodied in order to illustrate the possibility of embodying the invention in various forms without departing from its scope. In Fig. 2 numeral 20 designates a body or carrier, preferably of clear glass, or the like, on the front surface or face 21 of which is carried the filter 10ª and on the rear surface of which is carried the body of silver 12ª having a reflective surface 11ª facing inward or towards the filter 10ª. In a construction and arrangement of this character the filter 10ª may be in the form of a gelatine body carrying the desired filtering material or materials arranged against or permanently secured to the front surface 21 of the body 20, or it may be a body of glass carrying the necessary filtering material or materials made integral with or fused to the body 20.

The operation of the device provided by the present invention will be obvious from the foregoing description and from inspection of the drawings. Light falling on the filter first passes inwardly through it and is thus filtered, is then reflected by the reflecting surface, and upon being reflected passes outwardly through the filter. It will be obvious that only the light passed by the filter is reflected by the reflecting surface.

The present invention is not specifically concerned with the material or materials employed in the filter or reflective surface nor with what lights are filtered by or to what degree lights are filtered by the filter. It will be obvious that the filter may be made to selectively filter whatever light or lights may be desired and that materials such as are ordinarily used in color filters, and the like, may be employed in carrying out the present invention. For filtering light in a manner to cut it off and modify it to correspond to the manner in which it is registered by ordinary photographic apparatus a filter somewhat lighter or weaker than a Wratten color filter No. 49 may be advantageously employed. Under various lighting conditions and under special circumstances various filters may be employed in carrying out the invention. Further, it will be obvious that in practice a filter may be selected which will properly suit the particular circumstances and will compensate for the actions of the reflective surfaces in the device and for the colors, or colored absorption qualities of, the various parts of the device.

I may state that the device provided by the present invention is not specifically limited to being used as a make-up mirror, or the like, for it may be found desirable and advantageous in other connections. For instance, it may be found desirable for use in artificially lighted salesrooms for the purpose of filtering light to make articles appear as they would in daylight.

The invention may be carried out by providing a reflective surface which is treated or colored to also select or filter the light reflected. For example, a metal surface polished to reflect light may be of a color or character to select light, or, the reflective surface may be on a body of material which is of a color or nature to select light.

Having described only typical embodiments of my invention I do not wish to limit myself to the particular details hereinabove set forth but wish to reserve to myself any changes or variations that may appear to those skilled in the art or that may fall within the scope of the following claims.

Having described a preferred form of my invention, I claim:

1. A mirror for the purpose of showing a reflected image of an object as the object will appear in a photograph, that includes a reflective surface, and light selective means associated with the reflective surface, said means selecting light so that the light reflected is characterized by a relative predominance of actinic rays.

2. A mirror for the purpose of showing a reflected image of an object as the object will appear in a photograph, that includes a reflective surface, and light selective means located at the reflective surface, said means selecting light so that the light reflected is characterized by a relative predominance of actinic rays.

3. A mirror for the purpose of showing a reflected image of an object as the object will appear in a photograph, that includes a reflective surface, and light selective means located at and forming a unitary body with the reflective surface, said means selecting light so that the light reflected is characterized by a relative predominance of actinic rays.

4. A mirror for the purpose of showing a reflected image of an object as the object will appear in a photograph, that includes a reflective surface, and light selective means associated with the reflective surface, said means acting in conjunction with the characteristics of reflection of the reflective surface to absorb predominantly non-actinic rays and transmit back in reflection predominantly actinic rays.

In witness that I claim the foregoing I have hereunto subscribed my name this 13th day of September 1921.

GORDON B. POLLOCK.